(12) United States Patent
Ueyoko et al.

(10) Patent No.: US 8,376,011 B2
(45) Date of Patent: Feb. 19, 2013

(54) AIRCRAFT RADIAL TIRE

(75) Inventors: Kiyoshi Ueyoko, Copley, OH (US); Clarence Byrd Alsobrook, Akron, OH (US); Badal Das, Strongsville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 836 days.

(21) Appl. No.: 12/334,897

(22) Filed: Dec. 15, 2008

(65) Prior Publication Data
US 2010/0147434 A1    Jun. 17, 2010

(51) Int. Cl.
*B60C 15/024*    (2006.01)
(52) U.S. Cl. ........ 152/539; 152/531; 152/533; 152/543; 152/552
(58) Field of Classification Search .................. 152/531, 152/533, 539, 540, 541, 543, 546, 547, 548, 152/552, 554
See application file for complete search history.

(56) References Cited

U.S. PATENT DOCUMENTS

| | | | | |
|---|---|---|---|---|
| 3,623,527 | A * | 11/1971 | O'Neil et al. | 152/54 |
| 3,949,798 | A * | 4/1976 | Gardner et al. | 152/454 |
| 5,105,865 | A * | 4/1992 | Togashi et al. | 152/454 |
| 5,409,048 | A * | 4/1995 | Kipp et al. | 152/381.4 |
| 6,318,431 | B1 * | 11/2001 | Ueyoko et al. | 152/543 |
| 6,367,526 | B1 * | 4/2002 | Hubbell, Jr. | 152/209.1 |
| 6,568,444 | B1 * | 5/2003 | Kaneko | 152/209.18 |
| 7,188,655 | B2 * | 3/2007 | Waki | 152/543 |
| 7,308,924 | B2 * | 12/2007 | Kajita | 152/552 |
| 7,347,243 | B2 * | 3/2008 | Waki | 152/543 |
| 2005/0155688 | A1 * | 7/2005 | Waki | 152/543 |
| 2007/0144647 | A1 * | 6/2007 | Masaoka et al. | 152/454 |

FOREIGN PATENT DOCUMENTS

| | | |
|---|---|---|
| EP | 0267139 | 5/1988 |
| EP | 1331108 | 7/2003 |
| EP | 2133218 | 12/2009 |

OTHER PUBLICATIONS

European Search Report completed Jan. 2, 2012.

* cited by examiner

*Primary Examiner* — Joseph Del Sole
*Assistant Examiner* — Seyed Masoud Melkzadeh
(74) *Attorney, Agent, or Firm* — June E. Rickey

(57) ABSTRACT

A pneumatic radial aircraft tire is described having a B/A ranging between 60-70%, wherein B is the width of the tire between the wheel flange, and A is the inflated tire width under rated pressure. The tire may further optionally include a tire bead portion having a Ra/Fr1 relationship which ranges from about 1 to about 2.1, wherein: Ra is the tire heel radius at uninflated and in an new and unused condition, and Fr1 is the wheel flange elliptical radius at the heel section of the tire. The tire may further optionally include a SW/TS ratio which ranges from about 0.1 to about 0.5, wherein SW is the chafer gauge at area A, TS is the total sidewall rubber gauge at area A, wherein A is defined as the region in the sidewall that has a lower radial endpoint defined by the point of contact between the flange and the tire at inflated, unloaded condition, and an upper radial endpoint Ah defined by the tire wheel flange point of contact when the tire is at inflated, and at 100% rated load.

9 Claims, 4 Drawing Sheets

AIRCRAFT RADIAL TIRE

This invention relates in general to radial ply tires, and more particularly to tires subjected to very heavy loads and high pressures.

BACKGROUND OF THE INVENTION

Aircraft tires are subject to extreme operating conditions due to the heavy load per tire coupled with the high speed of the aircraft. Because of the heavy loading, the tires are subject to much greater deflection that passenger or truck tires.

Aircraft tires have two common constructions: bias and radial. Over 80% of aircraft tires are bias, which means they have a casing made of layers of alternate layers of ply that are at alternate angles substantially less than 90 degrees relative to the center line of the tread. However, radial tires are becoming more common as airframe manufacturers seek lighter weight. Radial tires are like passenger tires in that they have the ply oriented at substantially 90 degrees relative to the tread centerline. Aircraft tires come in a range of sizes, however the H size range has historically been a bias tire. Due to the modern trend, it is desired that radial aircraft tires are available in the H size. This has not been possible in the past because they have more deflection in the sidewall due to bending under loading. As a result, radial tires may have an increased heat generation and mechanical fatigue in the bead area of the tire. There may also be problems of bead cracking and scuffing in the bead region, as well as rubber deformation under the bead core.

Thus an improved radial tire with increased fatigue and bending resistance is desired.

SUMMARY OF THE INVENTION

A first aspect of the invention is a pneumatic aircraft tire having a radial carcass, tread, a crown reinforcement including one or more belt layers or strips reinforced by cords oriented relative to the circumferential direction at an angle of between 0° and 45° with respect to the equatorial plane of the tire. The B/Ao of the tire ranges between 60-70%, wherein B is the width of the tire between the wheel flange, and A is the inflated tire width under rated pressure.

A second aspect of the invention including a pneumatic aircraft tire having a radial carcass, tread, a crown reinforcement having one or more belt layers or strips reinforced by cords oriented relative to the circumferential direction at an angle of between 0° and 45° with respect to the equatorial plane of the tire. The tire includes a B/Ao ratio which ranges from about 0.6 to about 0.7, wherein B is the width of the tire between the wheel flange, and Ao is the inflated tire width under rated pressure. The tire may further optionally include a tire bead portion having a Ra/Fr1 relationship which ranges from about 0.6 to about 2.1, wherein: Ra is the tire radius of the bead sidewall at uninflated and in a new and unused condition, and Fr1 is the wheel flange maximum elliptical radius. The tire may further optionally include a SW/TS ratio which ranges from about 0.1 to about 0.5, wherein SW is the chafer gauge at area A, TS is the total sidewall rubber gauge at area A, wherein A is defined as the region in the sidewall that has a lower radial endpoint defined by the point of contact between the flange and the tire at inflated, unloaded condition, and an upper radial endpoint $A_H$ defined by the tire wheel flange point of contact when the tire is at inflated, and at 100% rated load.

DEFINITIONS

"Apex" means a non-reinforced elastomer positioned radially above a bead core.

"Aspect ratio" of the tire means the ratio of its section height to its section width multiplied by 100% for expression as percentage.

"Axial" and "axially" means lines or directions that are parallel to the axis of rotation of the tire.

"Bead" means that part of the tire comprising an annular tensile member wrapped by, or otherwise attached to ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 5° to 45° with respect to the equatorial plane of the tire.

"Bias ply tire" means a tire having a carcass with reinforcing cords in the carcass ply extending diagonally across the tire from bead core to bead core at about a 25°-65° angle with respect to the equatorial plane of the tire. Cords run at opposite angles in alternate layers.

"Carcass" means the tire structure apart from the belt structure tread, under tread, and sidewall rubber over the plies, but including the beads.

"Circumferential" means lines or direction extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core.

"Footprint" means the contact patch are area of the tire tread with a flat surface at zero speed and under normal load and pressure.

"H type tire" means a $B/A_o$ range of between 60-70%, wherein B is the width between the wheel flange, and $A_o$ is the inflated tire width under rated pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint including non-contacting portions such as grooves.

"Normal inflation pressure" refers to the specific design inflation pressure and load assigned by the appropriate standards organization for the service condition for the tire.

BRIEF DESCRIPTION OF THE DRAWINGS

The invention will be described by way of example and with reference to the accompanying drawings in which.

DETAILED DESCRIPTION OF THE INVENTION

Figure 1:
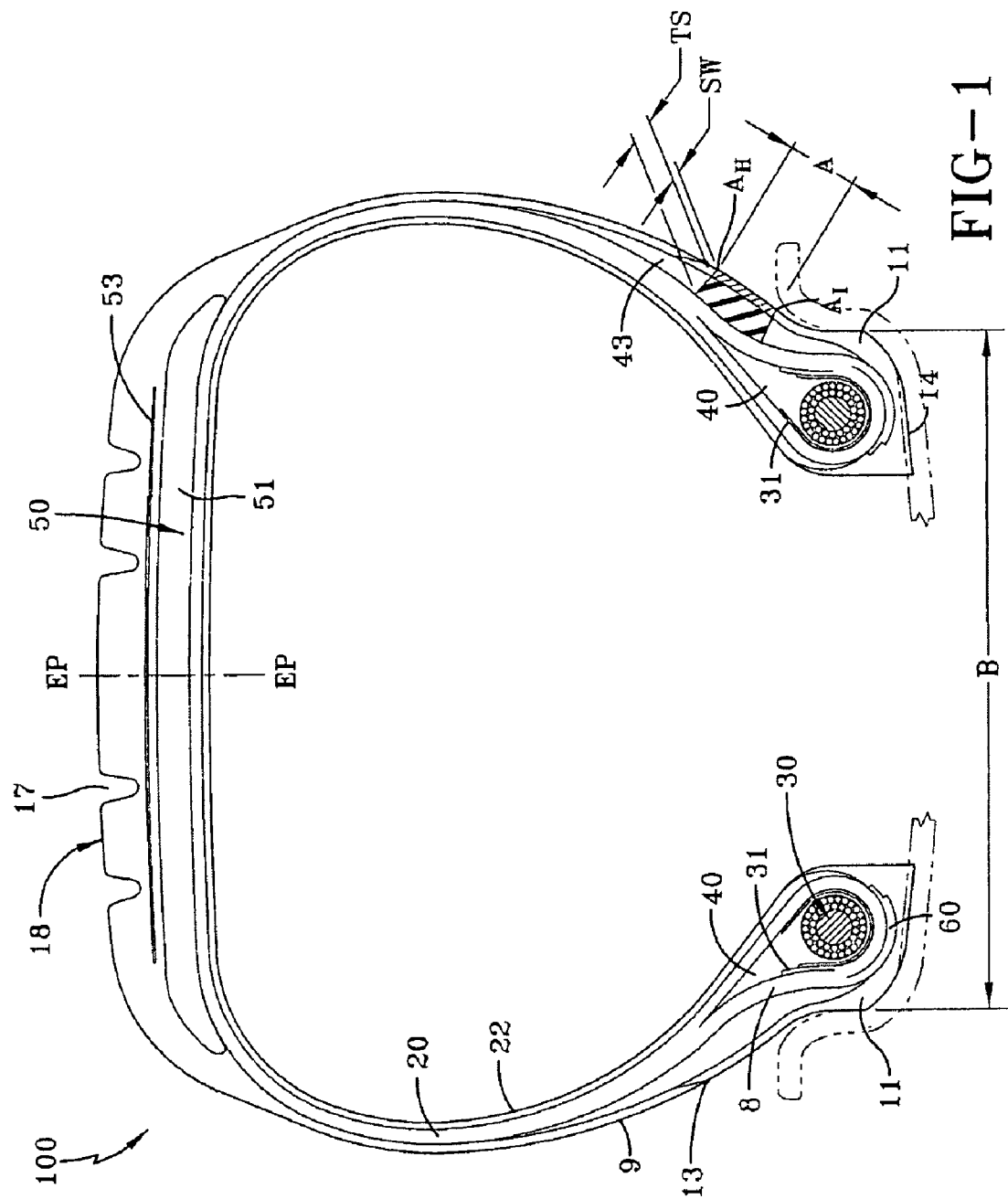
FIG. 1 is a cross-sectional view of a pneumatic radial tire employing the bead core design of the present invention.

With reference to FIG. 1, a cross-sectional view of a radial ply tire 100 is shown. The tire 100, as illustrated, is a construction for use as an aircraft tire. The tire 100 by way of example is a radial aircraft tire exposed to high internal pressures and tremendous loads. The invention is not limited to an aircraft tire, and may be used on other tires such as earthmover, commercial truck and off the road tires.

The tire 100 is a radial ply tire of the tubeless type construction. The tire 100 has an air imperious inner liner 22 which contains fluid or air under pressure. Radially outward of the inner liner 22 are one or more radial plies 20. Each ply 20 extends from an annular tensile member commonly referred to as a bead core 30. As shown the plies 20 may wrap about the bead core 30 either turning axially out and up forming a ply turnup or alternately turning axially in and under the bead core 30. The plies may be anchored to the bead utilizing other configurations known to those skilled in the art.

Radially above the bead core 30 is a first rubber apex 40. The first rubber apex is preferably triangular in shape, and preferably does not extend past the point $A_H$, which is explained in more detail, below. A flipper 31 is wrapped around the first apex and bead core, and has ends radially inward of the apex 40. Preferably radially below the plies 20 is a chafer 11, which extends from a position radially inward of the bead to the bead toe, and then to the bead heel, to a position radially outward of the bead, terminating in a point $C_H$ 13. It is preferred that the chafer 11 extend radially outward so that the end $C_H$ 13 is radially outward of $A_H$. A is the contact area of the tire with the wheel flange, and has a lower point $A_I$ defined by the contact edge at inflated, but unloaded condition and an upper limit $A_H$ at inflated conditions under 100% rated load.

Axially outward of the plies 20 is a second, optional apex 43 which is an elongated strip of elastomeric material extending radially outward of the bead adjacent the chafer. This apex 43 is interposed between the sidewall 9, the chafer 11 and the ply 20.

Radially outward of the carcass plies 20 is a plurality of belt reinforcing layers 50, each layer is reinforced with cords 51. A fabric layer 53 is shown radially outward of the belt layers 50. Above the fabric layer 53 is a tread 18 as shown, the tread 18 has a plurality of circumferentially continuous grooves 17.

Figure 2:
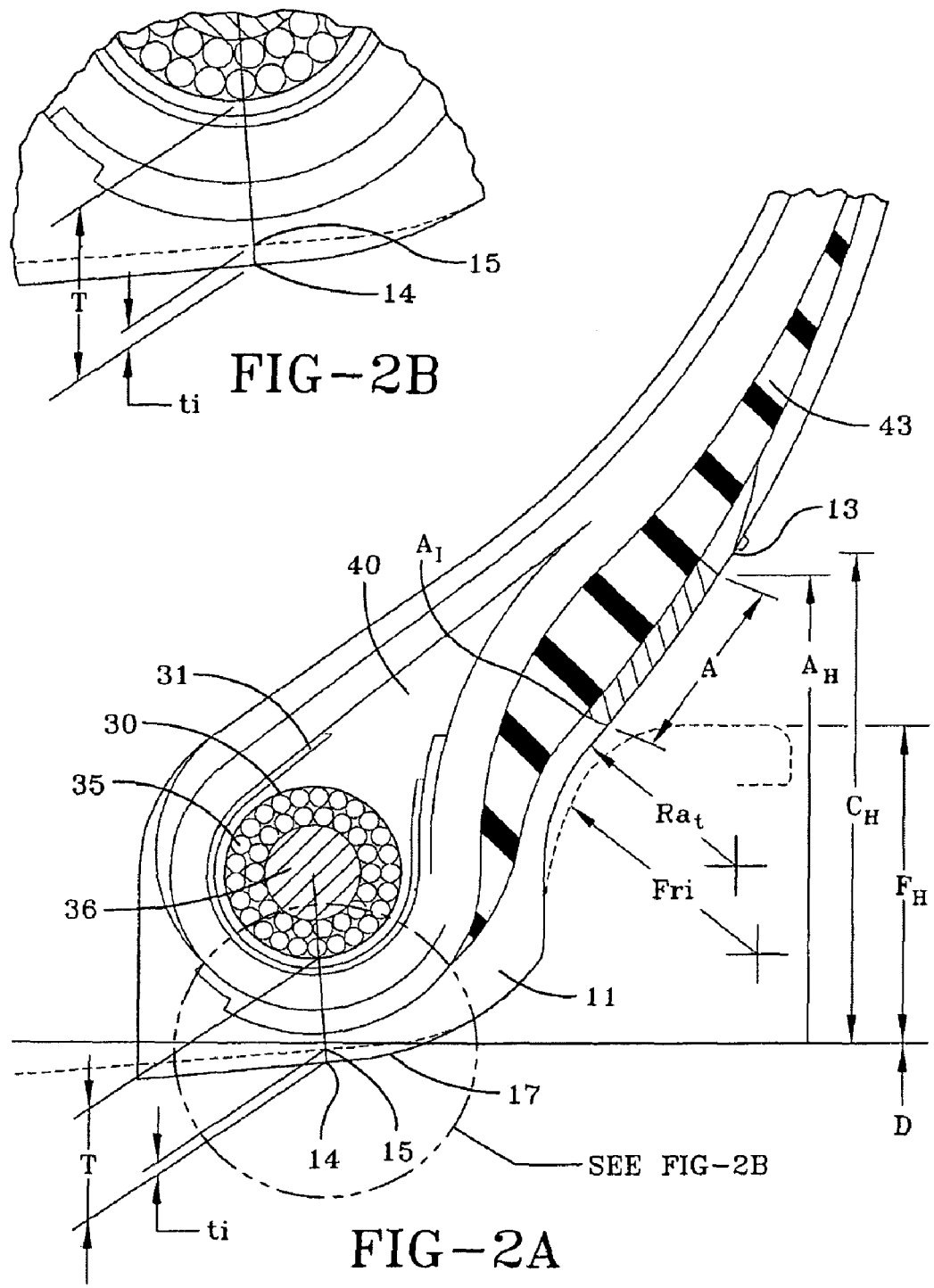
FIG. 2 is a cross-sectional view of the bead portion of the tire of FIG. 1.

The tire structure 100 as mentioned is an example of one type of tire structures that can utilize the bead core 30, of the present invention. Although the tire 100 as shown is an aircraft tire structure, the invention is also usable in other tires such as for example, truck tires, off the road tires, or highly loaded heavy-duty tires. With reference to FIG. 2, the bead core 30 of the present invention is shown. As illustrated the central core 33 is shown as a single wire or rod 34 wound at 360°. The ends of the wire 34 are preferably welded to form one continuous hoop or central core 33. The central core 33 is made of an alloy of aluminum, or other lightweight metal alloy such as magnesium, titanium, or any metal alloy having a weight less than steel.

Aluminum is an ideal alloy in that it provides excellent corrosion resistance when used with steel and it is very strong at the welded joint. Aluminum can be tempered, further increasing the tensile strength of the central core 33. The tensile strength of 6061 aluminum alloys can vary in the range of 125 MPa for $6061T_0$ to 310 MPa for $6061T_6$. Aluminum alloys in $6061T_4$ range have superb strength ratios while maintaining excellent ductility.

As further illustrated the central core 33 is wrapped by a sheath of two or more sheath layers 35, preferably at least two sheath layers 35. The wires 36 of the sheath layers are steel helically or spirally wound about the central core 33. The invention is not limited to the bead core illustrated, and other bead designs may be utilized.

The bead area design of the present invention reduces the problem of bead cracking and deformation by reducing the tire wheel contact pressure and reducing the heat generation. As best shown in FIG. 2, the tire has a radius Ra. Ra is measured on a unused or new tire, and before mounting on the rim. The centerpoint of the radius Ra is located outside of the tire, resulting in a concave curvature on the rim contact portion of the tire. If the flange selected for use has an elliptical shape with the maximum radius $F_{R1}$, then Ra should range in value from 0.6 to 2.1 times $F_{r1}$, and more preferably from about 1.3 to about 2.1 times $F_{r1}$. This results in reduced heat generation caused by the bead rubbing against the flange.

The bead of the present invention is designed to have a bead compression ratio of less than about 24%, and more preferably less than about 18%. The bead compression ratio can be defined by t1/T, wherein: t1 is the interference gauge of chafer rubber between the rim and the tire, as measured under the center of the bead core perpendicular to tire bead seat surface 14. t1 can be calculated by subtracting the bead seat radius from the rim flange radius. T is the total material gauge under the bead core as measured in a radial direction along the bead core centerline, from the radially innermost edge 15 of the bead core 33 to the radially innermost edge of the bead area 14.

Therefore, $$\frac{t1}{T} \leq .24;$$

and more preferably, number $$\frac{t1}{T} \leq .18$$

In order to improve the bead durability, another important parameter is defined by the following relationship:

$$\frac{SW}{TS} = 0.1 \sim 0.5$$

Wherein: SW is the gauge thickness of the sidewall at point A;

A is the contact area of the tire with the wheel flange, and has a lower point A1 defined by the contact edge at inflated, but unloaded condition and an upper limit $A_H$ at inflated conditions, and loaded under 100% rated load; TS is the total rubber gauge of the sidewall and other rubber components such as the apex, which is axially outward of the ply, as measured at the point $A_H$.

Table I, below, lists tabulated values and results for example tires 1 through 6. All of the tires were the following size: H37.5×12.0R19 20PR mounted on wheel size: H37.5× 12.0R19 with an elliptical flange shape and width between the wheel flange is 7.75". The parameters Ra, Fr1, T, t1, TS, Sw were determined. All of the tires in Table I were subjected to a taxing distance index, which was measured on each tire tested on a dynamic tire tester, at a rated load of 25,600 lbs at a rated pressure of 212 psi, at a test speed at 40 mph under a test load at 51200 lbs. The tire was run continuously at the test conditions until the tire blew out.

Each tire construction of Table 1 was subjected to a FAA TSO test. After the test, the chafing index was determined for each tire by visual inspection and measurement of the width, depth and length of cracking in the bead area. The bead deformation under the bead core at the bead seat was also measured by measuring the depth gauge of the deformation. For all three indexes, the higher the numerical value, the better the performance. Thus the best performing tire for all three indexes were examples 5 and 6 of the present invention.

TABLE I

|  | Example 1 | Example 2 | Example 3 | Example 4 | Example 5 | Example 6 |
|---|---|---|---|---|---|---|
| Ra (mm) | 71 | 50 | 19.8 | 10 | 19.8 | 19.8 |
| Fr1 (mm) | 19.7 | 19.7 | 19.7 | 19.7 | 19.7 | 19.7 |
| T (mm) | 13.1 | 13.6 | 11.4 | 11.4 | 11.4 | 11.4 |
| t1 (mm) | 3.8 | 4.3 | 1.8 | 1.8 | 1.3 | 1.3 |
| TS (mm) | 8 | 8.5 | 16 | 16 | 11 | 11 |
| SW (mm) | 6 | 6 | 3 | 5 | 3 | 3 |
| $C_H$-$A_H$ (mm) | 3.5 | 6.5 | −16.5 | 3.5 | 3.5 | 3.5 |
| Ra/Fr1 | 3.60 | 2.54 | 1.01 | 0.51 | 1.01 | 1.01 |
| BCP(t1/T) | 0.29 | 0.32 | 0.16 | 0.16 | 0.11 | 0.11 |
| SW/TS | 0.75 | 0.71 | 0.19 | 0.31 | 0.27 | 0.27 |
| Taxing distance (index) | 100 | 98 | 145 | 118 | 140 | 145 |
| Bead deformation under bead core (index) | 100 | 92 | 120 | 120 | 130 | 130 |
| Chafing (index) | 100 | 100 | 83 | 97 | 120 | 120 |

Figure 3:
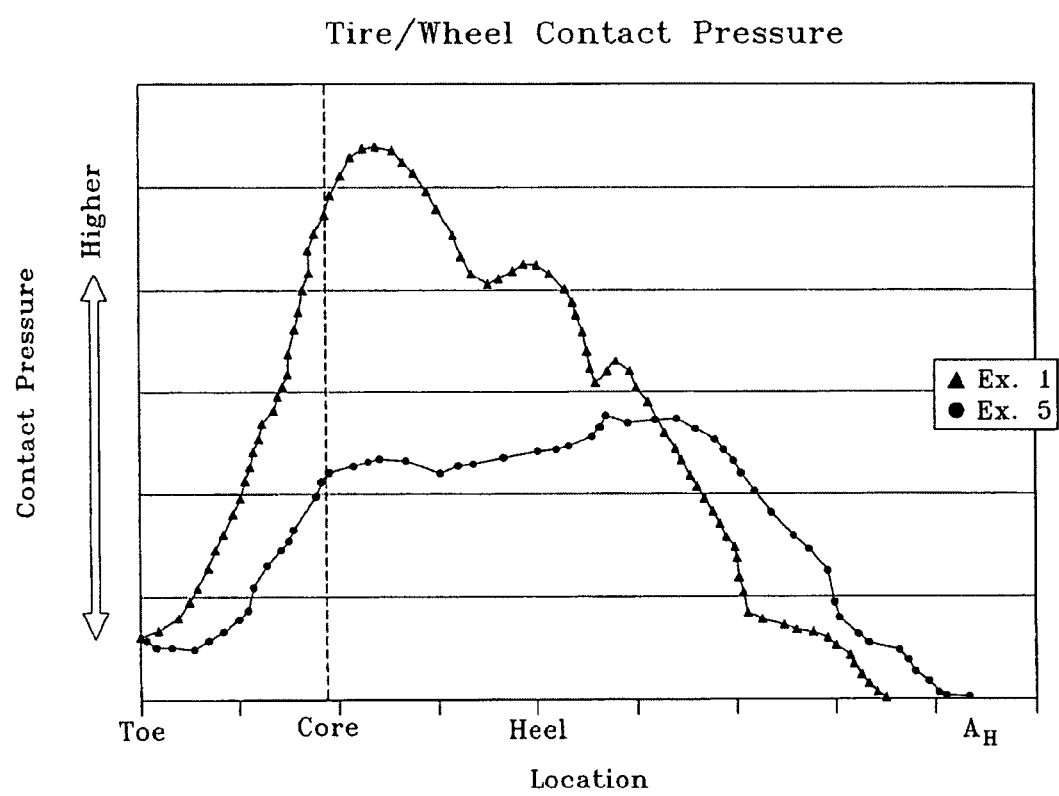
FIG. 3 is a plot of tire wheel contact pressure for the present invention.

FIG. 3 illustrates contact pressure test results taken for the example 1 tire and example tire 5 of the present invention. The example 1 tire test results indicated a peak contact pressure at the midpoint between the toe and the heel. The maximum contact pressure value for the example 1 tire was 4 times greater than the example 5 tire. Thus the example 5 tire showed better performance.

Figure 4:
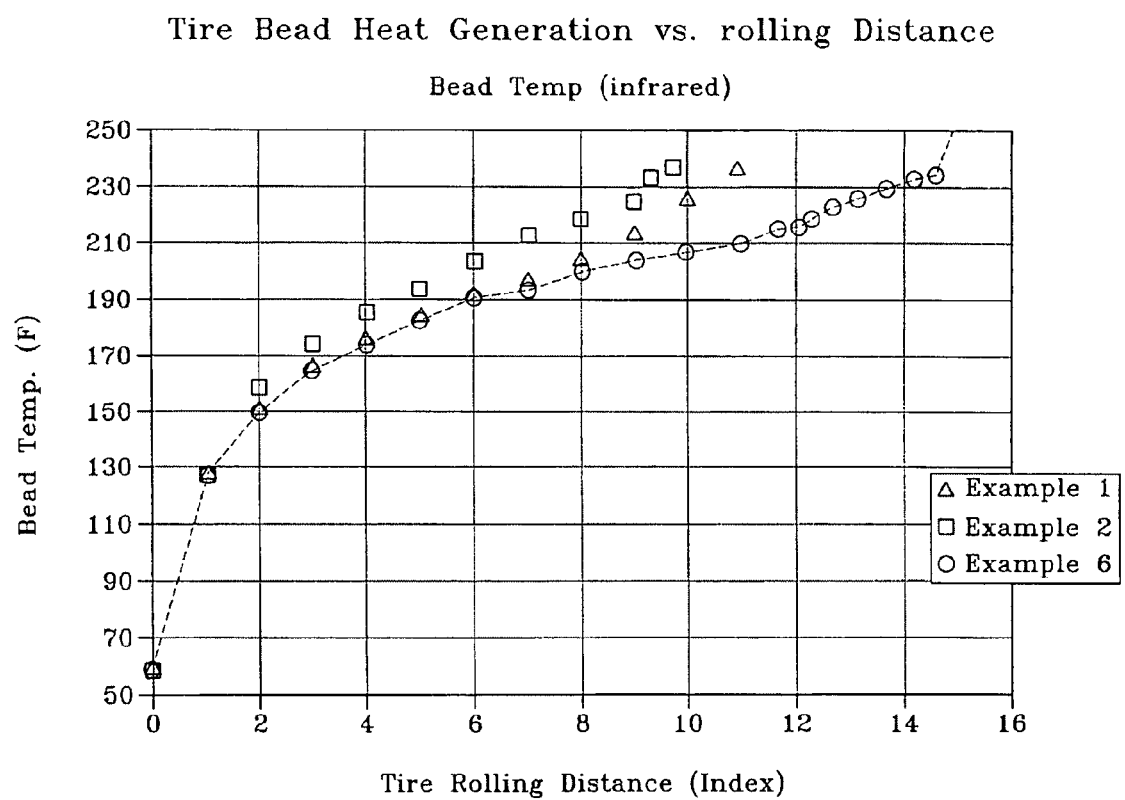
FIG. 4 is a plot of tire bead heat generation versus rolling distance for the invention.

FIG. 4 illustrates actual test data of bead temperature vs. distance (index) for the example 1 tire, the example 2 tire and the example 6 tire. As a low bead temperature was desired, the example 6 tire was the better performer.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full-intended scope of the invention as defined by the following appended claims.

What is claimed:

1. A pneumatic aircraft tire having a carcass having one or more radial plies, a tread, a crown reinforcement comprising one or more belt layers or strips reinforced by cords oriented relative to a circumferential direction at an angle of between 0° and 45° with respect to an equatorial plane of the tire, and the B/$A_o$ ratio of the tire ranges between about 0.6 to about 0.7, wherein B is the width between a wheel flange, and $A_o$ is an inflated tire width under rated pressure, and a tire bead portion having a $R_a$/Fr1 relationship which ranges from about 0.6 to about 2.1, wherein $R_a$ is the tire bead portion radius at un-inflated and in a new or unused condition, and a centerpoint of the radius $R_a$ is located outside of the tire, and Fr1 is the wheel flange maximum elliptical radius.

2. The pneumatic tire of claim 1 having a bead core formed by a plurality of sheath wires enveloping a central core that is a light weight metal alloy material having a weight less than steel metal.

3. The pneumatic tire of claim 1 wherein said tire is mounted on a wheel having a flange that has an elliptical shape in the region that mates with the heel portion of the tire.

4. The pneumatic tire of claim 3, wherein the bead compression ratio t1/T of the material under the bead core on the wheel in a new or un-used condition is less than 24%, wherein t1 is the interference gauge of the rubber under the bead core, and T is the total material gauge radially inward or under the bead core.

5. The pneumatic tire of claim 4 wherein the bead compression ratio t1/T is less than 18%.

6. The pneumatic tire of claim 3, wherein the chafer ending is radially outward of $A_H$, wherein $A_H$ is defined by the tire wheel flange point of contact when the tire is at inflated, and at 100% rated load.

7. The pneumatic tire of claim 6, wherein SW/TS ranges from about 0.1 to about 0.5, wherein SW is the chafer gauge at area A, TS is the total sidewall rubber gauge at area A, wherein A is defined as the region in the sidewall that has a lower radial endpoint defined by the point of contact between the flange and the tire at inflated, unloaded condition, and an upper radial endpoint defined by the tire wheel flange point of contact when the tire is at inflated, and at 100% rated load.

8. The pneumatic tire of claim 6, wherein the chafer is made of rubber having a 300% modulus (M300) range of about 5 to about 15 mpa.

9. A pneumatic aircraft tire having a radial carcass, tread, a crown reinforcement comprising one or more belt layers or strips reinforced by cords oriented relative to a circumferential direction at an angle of between 0° and 45° with respect to an equatorial plane of the tire, and the B/Ao ratio of the tire ranges between about 0.6 to about 0.7, wherein B is the width between a wheel flange, and Ao is an inflated tire width under rated pressure, a tire bead portion having a Ra/Fr1 relationship which ranges from about 0.6 to about 2.1, wherein: Ra is the tire bead portion radius at uninflated and in an new and unused condition, and has a centerpoint of the radius Ra is located outside of the tire and Fr1 is the wheel flange maximum elliptical radius;

and SW/TS ratio ranges from about 0.1 to about 0.5, wherein SW is the chafer gauge at area A, TS is the total sidewall rubber gauge at area A, wherein A is defined as the region in the sidewall that has a lower radial endpoint defined by the point of contact between the flange and the tire at inflated, unloaded condition, and an upper radial endpoint AH defined by the tire wheel flange point of contact when the tire is at inflated, and at 100% rated load.

* * * * *